Patented Apr. 23, 1940

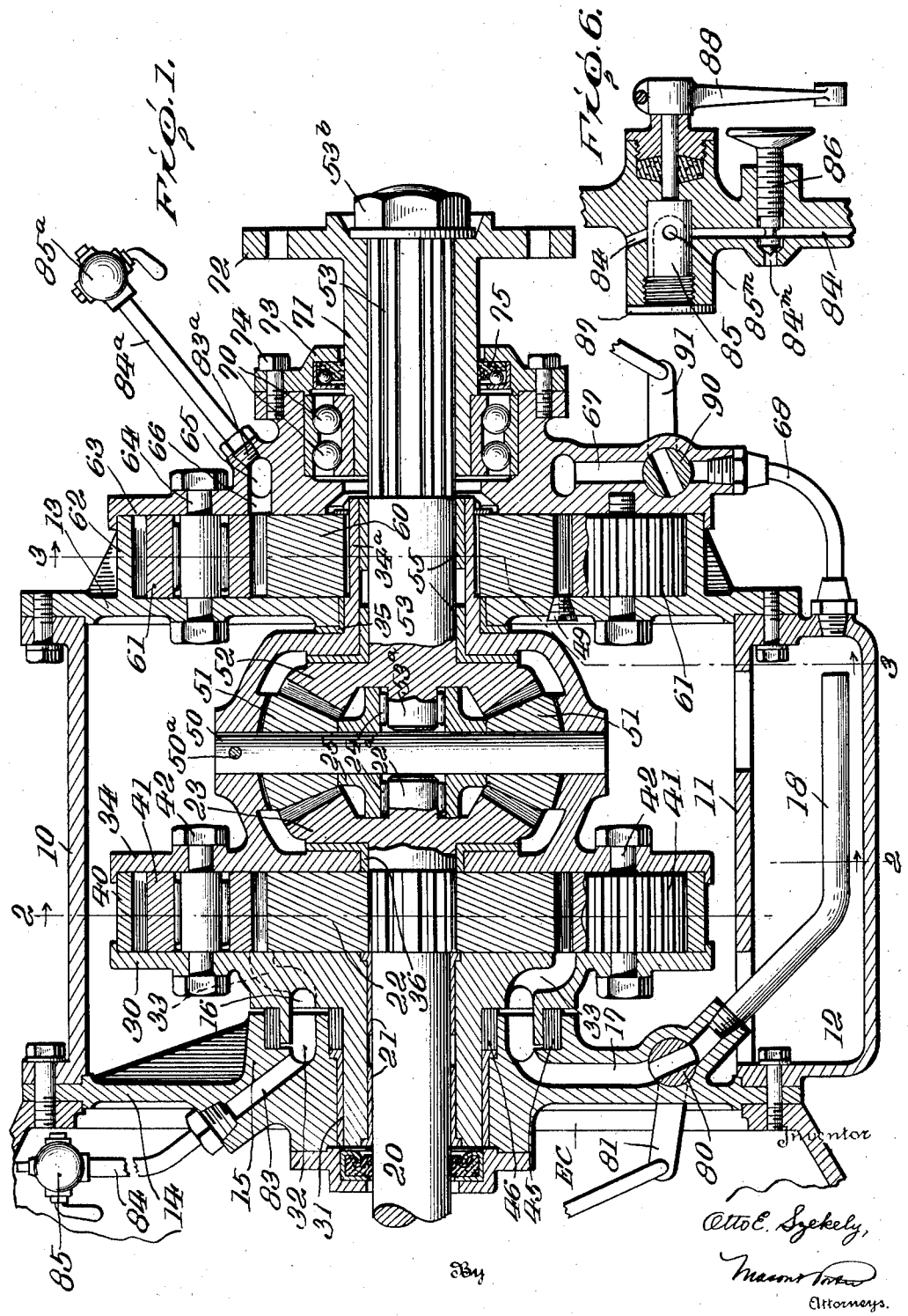

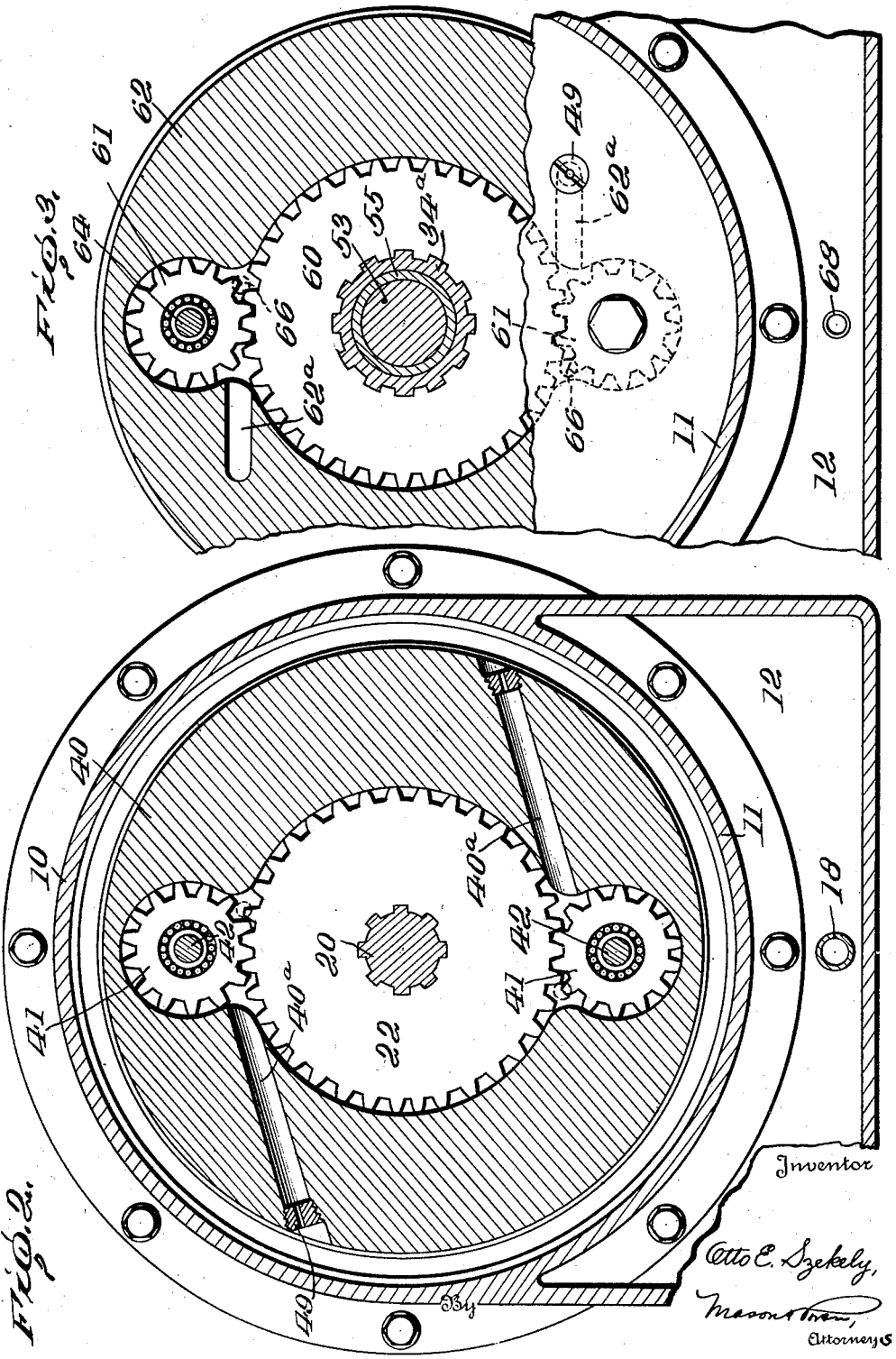

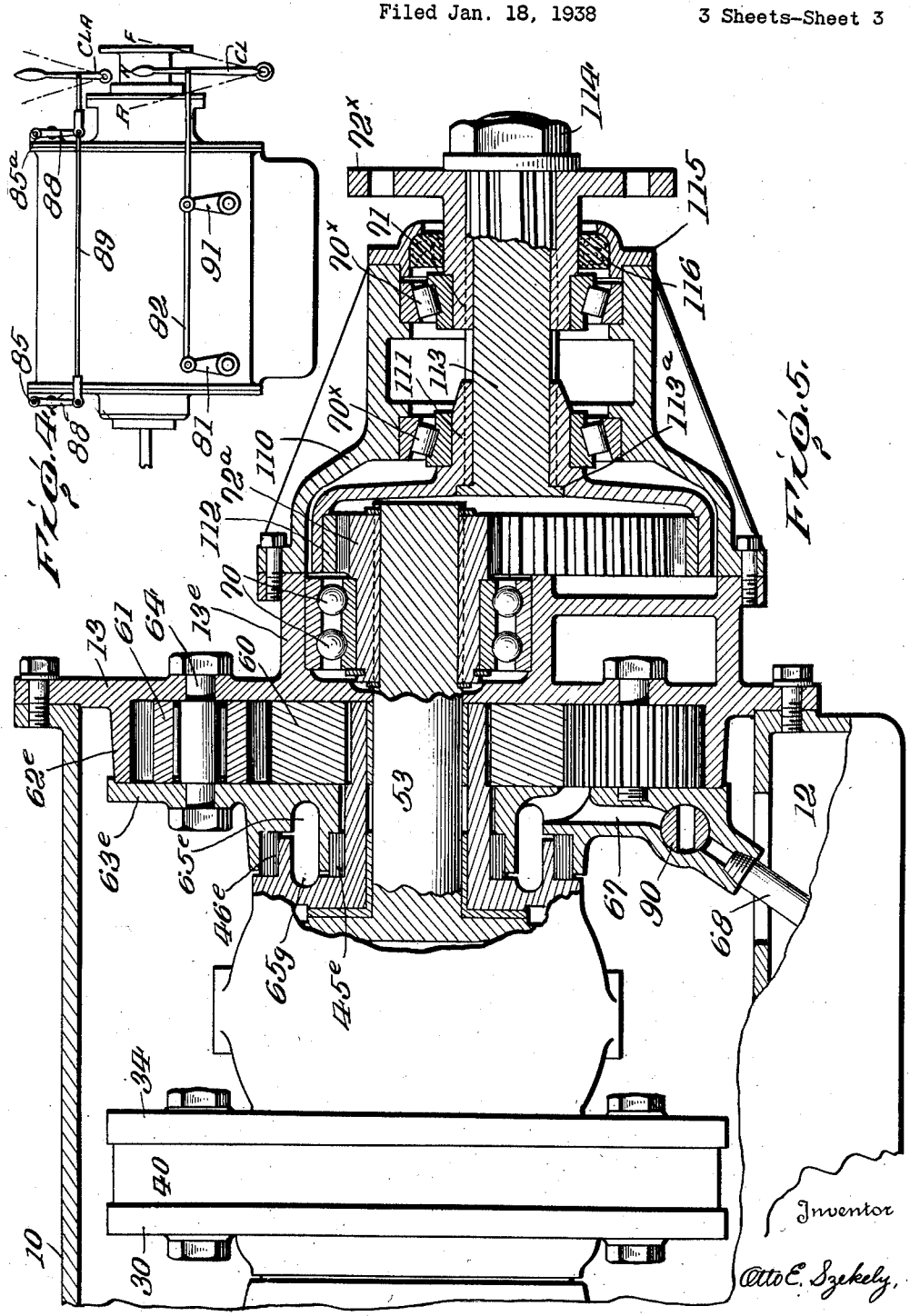

2,198,398

UNITED STATES PATENT OFFICE 2,198,398

VARIABLE SPEED REVERSIBLE TRANSMISSION

Otto E. Szekely, Willow Grove, Pa., assignor to The Szekely Company, Inc., a corporation of New York Application January 18, 1938, Serial No. 185,619

15 Claims. (Cl. 74—297)

The present invention relates to improvements in mechanism for transferring power from a prime mover to a load, and includes means for reversing the direction of actuation of the load.

One of the features of the present invention is the provision of such a mechanism for obtaining forward and backward movement of a load, and including fluid-pressure means for controlling the torque and speed effects delivered at the load, as well as the direction of actuation thereof.

Another feature of the present invention is an assemblage of parts by which a reverse gear comprises parts which are selectively controlled under one condition for producing coupling between the structures connected to the prime mover and structures which are actuated under idling conditions at a speed determined by the difference of the speeds of the prime mover and of the load, and under another condition for producing coupling through a fluid-pressure reaction means between said structures and a fixed frame for producing a movement of the load in the opposite direction.

A further feature of the present invention is an assemblage of parts which is specifically advantageous for the coupling of a marine engine to a propeller, and comprises a differential gearing having two sun gears and a planet pinion, with a hydraulic displacement means connected for immobilizing the axis of the planet pinion with respect to a fixed frame, and a further hydraulic displacement means for causing said axis to turn at the speed of the prime mover, together with means for controlling the operation of the two hydraulic displacement means, and permitting a quick unloading thereof so that the propeller can be changed from one direction of movement to the other with great rapidity.

With these and other features in view as objects of the invention, as will appear in the course of the following description and claims and as set out in the drawings, illustrative forms of construction are disclosed by these drawings, in which:

Figure 1 is an upright longitudinal sectional view through a transmission.

Figure 2 is a transverse upright sectional view substantially on line 2—2 of Fig. 1.

Figure 3 is a similar sectional view substantially on line 3—3 of Fig. 1.

Figure 4 is an exterior view or side elevation, showing connections for controlling devices.

Figure 5 is a fragmentary view corresponding to a part of Fig. 1, but illustrating modifications of structure.

Figure 6 is a sectional view through an air control valve arrangement, in fully closed position of the manually operable valve.

In these drawings, a fixed frame is provided by outer housing structures which are supported in suitable manner, as by connection to the crank case EC of a prime mover, which may be an internal combustion engine or other suitable energy converter. The housing structures include a central portion 10 having an apertured partition 11 extending in a generally horizontal direction beneath the rotating parts for dividing the mechanism space from a sump space 12. The opening at the rear or driven end of the central structure 10 is closed by a rear end structure 13. The opening at the driving end of this central structure 10 is closed by a member including a flange 14 which is bolted or otherwise secured both to the central portion 10 and to the general support EC, and includes an inwardly extending annular structure 15; this end structure also comprises an annular channel 16 and a duct or passage 17, and is further provided with a tube 18 establishing an inlet connection to the passage 17 and leading to a desired point of the sump 12. In marine engine work, for example, it is not unusual for the engine crank shaft and propeller shaft to incline relatively downward from the engine to the propeller, and hence, in the illustrated form, the open end of the tube 18 is near the rear end of the sump 12.

The prime mover is connected to a driving shaft 20 which is supported by appropriate bearings such as the bronze sleeves 21, and extends through an inner gear 22 of a first gear pump, and is fixedly connected therewith and also with a first sun gear 23 of a differentiating gearing. A stub end 22a of the driving shaft 20 is received by a roller bearing 24 in a central hub 25 of a differential spider, as will be more closely described hereinafter.

A revoluble differential cage is constituted by a front end member 30 which receives the bronze sleeves 21 and is supported from the housing member 14 by a further bearing member 31. This member 30 has an annular channel 32 in alignment with the channel 16, and from this channel 32 the ports 33 lead to the pump gears for delivering liquid thereto. A second member 34 of the differential cage has a flange located parallel to the member 30 to provide space for the pump gears, and also includes a structure extending around differentiating gearing members including the aforesaid sun gear 23, and including a sleeve portion 34a which is supported by a bearing 35 for movement within the end structure 13. A further bearing 36 is provided between the shaft 20 and the member 34, closely adjacent the sun gear 23.

The space between the parallel faces of the members 30 and 34 is occupied (Figs. 1 and 2) by a filler structure and pump housing 40 which has cavities for the reception of the inner pump gear 22 and mating gear pump means illustrated as the two pump pinions 41. In the illustrated form, the pinions 41 are carried by bearings for rotation about fixed stud bolts 42 which pass through the members 30, 34, and also maintain the parts against separation under the liquid pressures which may be developed during the operation of the system.

The assembly of structures 30, 40, 34 thus rotates together, and constitutes with the gears 22, 41 a first hydraulic displacement means. The channels 16, 32 are constantly in open communication with one another, and are sealed against the escape of liquid therefrom or the penetration of air thereto, by the packings 45, 46.

The central spider portion 25 is formed with a pin 50 which extends radially away from the axis of the driving shaft 20, and receives the differential pinions 51 which, on the one hand, are in mesh with the driving sun gear 23, and on the other hand, are in mesh with the sun gear 52 which is splined to a driven or tail shaft 53. The tail shaft 53 has a stub end 53a which is supported by a bearing 24 within the spider 25, so that the spider 25 assists in maintaining the shafts 20 and 53 in accurate coaxial relationship. The sun gear 52 is supported in the differential casing by the bearings 55. It will be noted, further, that the pin 50 is held in place in the differential case member 30 by a securing pin 50a.

The sleeve portion 34a of the differential case is connected to a second inner pump gear 60 which is in mesh with pump pinions 61. The gears 60, 61 of this second hydraulic displacement means are received within a wall structure 62, and between the rear end wall structure 13 and a flange 63 parallel to this rear end wall structure. The pinions 61 are mounted for rotation on the stud bolts 64 which pass through the structures 13, 63, and serve in holding the parts together against the pressures of fluid which may be developed in the pump. The flange 63 is formed as a part of a general structure having an annular channel 65 therein which is in communication by ports 66 to supply fluid into the gear pump: the passage 65 communicates by a branch 67 and a conduit 68 with the sump 12.

In the form shown in Fig. 1, the tail shaft 53 is provided with a collar 71 and flange 72, by which it may be connected to the load to be driven, these parts being splined to the tail shaft 53. A heavy anti-friction bearing 70 is located between this drive assembly and an extension of the flange 63, the bearing being constructed and arranged to support both radial loads and end thrusts. This bearing 70 is held in position by an annular clamping collar 73 and the cap screws 74. An oil seal 75 is preferably included in this assembly. The flange 72 is held against axial movement by the nut 53b which engages the threaded outer end of the final drive shaft 53.

For the purpose of determining and controlling the flow of liquid to the hydraulic displacement means and the pressures to be developed thereby, the pump housing 40 is shown (Fig. 2) as having the discharge ports 40a, by which the fluid flows from the pump back into the space of the general housing and thus to the sump 12. These passages 40a receive calibrated plugs 49 which restrict flow of the fluid, and hence when the passages and pump are full of oil, the retardation on the movement of the oil sets up a back pressure at the pump which is sufficient substantially to block the same against relative movement of the gears 22, 41. For example, the size of this plug may be selected so that the maximum slippage at full load, and with the pump system full of oil, is around 5 percent.

For the control of the fluid in this first hydraulic displacement means, the passage 17 is provided with a rotatable closing member 80 constituting an oil supply valve, and having an external actuatable arm 81 (Fig. 4) which may be moved by a link 82 and the control lever CL to close off the flow of oil more or less, and is capable of fully obstructing the same in the position R and of permitting full flow in the position F, and it is preferred that the obstruction shall also occur in the position N. Further, the channel 16, 32 communicates by an air passage 83 with a conduit 84 which leads to a closing valve or cock 85. During the operation, the volume of flow of oil can be controlled by the movement of the valve 80, so that when the valve 80 is fully opened (position F), a maximum back pressure effect occurs by reason of the plugs 49; and when the valve 80 is fully closed (position R), no further oil has access from the sump 12 to the channel 16, 32, and thus into the pump. However, the pump is unable to expel all of the oil present therein, and hence a partial back pressure or dragging action may still occur. It is also possible to regulate the rate of oil flow by a partial breaking of the vacuum created in the channel 16, 32 by pump action, through a slight opening of the air valve 85. Furthermore, when the control rate is determined, as preferred, by the oil valve 80 (due to the greater sensitivity), it is possible to shift the system quickly from a condition of full drive and maximum torque to the idling position in which the pump parts have substantially no dragging effect, by quickly opening the air valve 85 so that, on the one hand, the suction of oil from the crank case 12 is stopped and, on the other hand, the entering air serves to scavenge and clear the pump of oil.

Such an employment of the air valve is conventionally shown in Fig. 1, while a preferred arrangement is shown in Fig. 6, in which the valve body 85 is received in a chamber of the housing structure and is provided with a stem which projects outwardly through a packing gland and fixedly receives an operating crank arm 88. The valve body is held in position and further sealed against leakage by the threaded closure plug 87. The passage 84 has a branch 84m open to atmosphere (illustratively, the interior of the engine or transmission housing) for control by a flow-regulating valve 86. The valve body 85 has a passage 85m which, when the structure is in proper position, establishes a substantially free flow of air through the conduit 84. When the valve body 85 is in closed position, a limited volume of air (determined by the adjustment of the valve 86) may enter through the branch conduit 84m and flow through the fluid displacement means, for controlling the proportioning of liquid and gas in the mixture being moved by this fluid displacement means.

The second hydraulic displacement means is similarly constructed, and has the discharge passages 62a in the member 62, these passages likewise being obstructed by plugs 49 of the character described above.

The annular passage 65 of this second displacement means has a branch 83a to a conduit 84a and a valve 85a: these parts having functions similar to the corresponding parts 83, 84, 85.

The conduit 84a and valve 85a are likewise shown conventionally in Fig. 1; and it is preferred to employ the structure indicated in Fig. 6. In such case, as shown in Fig. 4, the link 89 is connected to the two crank arms 88. Thus, when the lever CLA is moved, one valve (85 or 85a) is actuated toward closed position, while the other valve (85a or 85) is moved toward opened position.

This second displacement means has the supply of oil thereto, through the conduit 68 and passages 67, 65, controllable by a valve 90 which has an external actuating arm 91 connected to the link 82 (Fig. 4). It will be noted that the movements of link 82 which open the valve 80 are effective for closing the valve 90, and vice versa.

While the two control levers CL and CLA are shown in Fig. 4, it will be noted that the maximum effect, for a rapid change of direction of movement, is attained by operating the two levers together, as will appear more fully hereinafter.

The operation of this structure is as follows:

When the device is used for driving a boat, and the prime mover and boat are at a standstill, all parts of the mechanism are likewise to be assumed without motion relative to the housing 10, 13, 14. The sump 12 contains a quantity of liquid, such as low-freezing oil, and the valves 80, 90 are closed, with the control lever CL in the "N" or neutral position. The pump parts are assumed free of oil so that they can turn freely with respect to one another. The air valves 85 and 85a will be assumed closed.

The prime mover can now be started in an appropriate way, so that the shaft 20 is driven. If it be assumed that the shaft 20 is being turned at the speed of 1000 R. P. M., then the inner gear 22 of the first pump and its sun gear 23 are also being turned at this same rate. Since there is no back pressure at the first pump, and no retardation in the second pump upon the differential case member 34, the inner pump gear 22 merely spins the pump pinions 41, or the differential case may turn relative to the frame, or both actions may occur at the same time, depending upon the effect of small residual frictions. The bevel gear 23 turns the differential pinions 51 about their pins 50. Since the tail shaft 53 is at a standstill, the pinions 51 roll along the sun gear 52, and thus carry their axis pins 50, and thus rotate the differential case 34 and the pump housing structure 40. The rotation is governed by the ratio of the parts, and in the illustrated example, the differential case 34 will be turned in the same direction as the driving shaft 20, but at a speed of 500 R. P. M. Thus, the inner pump gear 22 is turning at 1000 R. P. M., while the pump housing is turning in the same direction but at a speed of 500 R. P. M.

To obtain forward motion of the vessel, the air valve 85 at least must be closed as by appropriate movement of control lever CLA and link 89. The control lever CL is then moved into the "F" position, so that oil valve 80 is moved toward open position: at this time, the valve 90 remains closed. The oil is drawn in from the tube 18 into the first pump and then discharged therefrom with retardation by the plugs 49 thereof, so that it is placed under pressure and a back pressure is established in the pump which appears as a force acting upon the pump housing and upon the differential case to accelerate the same in the direction of rotation of the driving shaft 20. This is accompanied by a pressure at the pins 50 upon the pinions 51, which seeks to cause the pinions to move faster bodily about the axis of the driving shaft 20. Since the speed of rotation of the sun gear 23 is fixed by the prime mover speed, this pressure operates to cause a rotation of the sun gear 52, and therewith of the tail shaft 53, so that the tail shaft is now brought into motion at a speed determined by the back pressure created by the opening of the valve 80, and the effect of the plugs 49, and by the load demand upon the tail shaft 53. Thus, for a given and constant load on the tail shaft 53, the successively greater obstructions and pressures created in gradually opening the valve 80 cause the tail shaft to turn faster and faster. In the particular example, for each increment of 100 R. P. M. of the differential case, the tail shaft 53 is given an increment of rotational speed of 200 R. P. M. Thus, when the valve 80 is fully opened and a hydraulic block exists at the pump, the pump housing 40 is turning at the same speed as the inner pump gear 22; that is, it is turning at the speed of the driving shaft 20 (less slippage occasioned by leakage from the hydraulic system). At this time, also, the pins 50 with the pinions 51 are being carried bodily around the common axis of shafts 20, 53 at this same speed: and the gear 52 is likewise being driven at this speed. Hence the ratio of drive is 1 : 1 or direct between the shafts 20 and 53. It will be noted that this ratio cannot be exceeded, as the blocking action involves a matter of back pressure created by the pump itself, and that the parts of the pump cannot overrun one another in this particular form of construction, by reason of power being introduced from the driving shaft 20.

If the load demand on the tail shaft 53 should increase, then the torque demand at the tail shaft 53 and sun gear 52 increases in similar ratio, and this increase will result in a rotation of pinions 51 about their pins 50. The rotation of the pinions 51 about their axes is accompanied by a relative movement of the differential case 34 and the pump housing 40 with respect to the driving shaft 20 and the inner pump gear 22, since the pressure effect formerly existing is no longer sufficient to maintain the parts at the particular relative speeds of the driving shaft 20 and driven shaft 53 which has been existing. Hence, the tail shaft 53 passes to a lower speed.

It is obvious that either in direct drive or at the intermediate speeds determined by the hydraulic control constituted by the pump and valves, any change in the speed and/or torque delivered to the driving shaft 20 will be accompanied by changes in the speed and/or torque at the load. Thus, for a given constant engine speed, at a torque which is precisely satisfying the load demand for torque at a low relative speed of the load, an increase of the torque output at this constant speed of the prime mover will occasion an increase in the speed of the tail shaft and thus of the load until the product of speed and torque at the load is again commensurate with the product of speed and torque at the driving shaft.

If it is desired to operate the tail shaft in a reverse direction from the aforesaid idling position, the control lever CL is moved into its "R" position so that the valve 90 is gradually opened while the valve 80 is retained closed. Valve 85a is assumed closed. The differential case has been turning the inner gear 60 of the second hydraulic displacement means in a forward direction at 500 R. P. M. The admission of oil into the second pump, with the back pressure created by the plugs 49 thereof, causes a braking effect to be exerted upon the inner gear 60, which retards the differential case 34 in its movement. The driving shaft 20 and sun gear 23 are turning at 1000 R. P. M., and this retardation of the differential case is accompanied by a speeding up of the planet pinions 51 in their movement about their pins, with the exertion of tooth pressure in the reverse direction upon the sun gear 52, and hence the shaft 53 is set in motion backwardly. When the valve 90 is opened to its maximum, the back pressure effects bring the pump gear 60 substantially to a standstill, so that the differential case 34 and the pins 50 are likewise substantially at a standstill, and the sun gear 23 operates through the planet pinions 51 as simple idlers to cause the sun gear 52 to turn in the reverse direction and at substantially the speed of the driving shaft 20.

It will be noted that each of these pumps can be quickly and immediately unloaded by opening the corresponding air valves 85 and 85a. This is of great advantage, as it permits the so-called maneuvering, by rapid changes of the application of power to the propeller for forward and reverse movements. In such cases, a mixture of oil and air may be considered as passing through the pumps, so that there is a cushioning effect, and shocks of transition are thus in part avoided.

The valves 85 and 85a are so connected by the link 89 that an inverse action occurs, so that one of the fluid displacement pumps is quickly unloaded while the other establishes a pressure condition so that it accepts and controls the transmission of the engine output. The cushioning effect during such transmission of power is effected by permitting a slight bleeding of air into the suction ports of the corresponding fluid displacement device; and for this purpose it is desired to employ a structure such as Fig. 6, where a closure of the main valve body still permits a regulated but minor quantity of air to move through a branch passage 84m under control of the corresponding needle valve 86.

In particular, it will be noted that when the links 82 and 89 are moved together, the fluid is shut off from one of the fluid displacement pumps at the same time that a large volume of air is admitted to this pump so that it rapidly empties itself and exerts substantially no drag upon the system. On the other hand, a supply of fluid is admitted to the other fluid displacement pump concurrently with the shutting down of the prior major admission of air thereto so that it begins to take up its load by its displacing action upon a cushioning mixture of liquid and air, the proportion of air being successively reduced until only the minor amount thereof, such as conditioned by the needle valve 86, is permitted to enter the pump.

By construction and arrangement, an intermediate position of the lever CL represents a "neutral" in which no liquid flows to either pump. The similar central position of control lever CLA is preferably likewise one in which air is being admitted to both pumps.

The particular construction lends itself also to the employment of a reduction gear for instances in which the speed of the prime mover is greater than that required at the load. In marine work, for example, an excessive speed of a propeller connected to the tail shaft 53 would result in cavitation and loss of efficiency during the accelerating and decelerating periods of the vessel, and at other times when the engine speed and propeller proportions are not appropriately devised.

From Fig. 5, it will be noted that the flange 72 is replaced by a gear 72a of small diameter. The clamping collar 73 is enlarged and replaced by a housing section 110. This rear housing structure 110 supports the roller bearings 70x and holds them against permitting endwise or axial movement in the final driven shaft. Since the reduction of speed represents also an increase in torque, and hence of probable thrusts for a given size of primary transmission structure, it is desirable in this form to provide ample strong bearings 70x. These bearings 70x support the sleeve 71 of the coupling flange 72x which is connected for driving the propeller, in this specific example, and also support the sleeve 111 of an internally cut gear 112 which is in mesh with the small gear 72a. Differences in the diameters of the gears 72a, 112 are provided for by the eccentric mountings of their respective shafts 53, 113. The structures 13, 13e, 110 provide an oil sump, which may be separate from the general oil sump 12, and receives a supply of lubricant which is being constantly lifted by the gear 112 in its movement, and thus delivered to the various bearing surfaces. The final driven shaft 113 is illustrated as being splined to the sleeves 71x, 111, and as having a collar 113a at its inner end and cooperating at its threaded outer end with a nut 114 to assure proper transfer of thrust effects to the bearings. The rear end of the housing 110 is closed by a ring 115 having an oil seal 116 therein.

Figure 5 also shows a further modification of construction in the second pump, which is employed for securing the movement in reverse direction. For this modification, the end wall 13 is provided with an inner pump housing 62e cooperating with a wall 63e for containing the gear structure 60 and the pump pinions 61. The bolts 64 are employed as before for securing the pump housing parts together, and for providing pivots for the pump pinion gears 61. In this form, the end wall 13 has an outwardly extending flange 13e for receiving the anti-friction bearing 70 as before, with the associated clamping parts. The wall 63e has an annular channel 65e which is in constant communication with a groove 65g in the differential case 34. A passage 67 leads from the channel 65e, 65g to the valve 90, and thence to the conduit 68 which opens into the sump 12. Packings 45e, 46e are provided to seal the parts. This form of construction is sometimes preferred, as it permits a quick disassembly and cleaning of all oil structures.

It is obvious that the invention is not limited solely to the construction shown, but that it may be employed in many ways within the scope of the appended claims.

I claim:

1. A reverse and control gear mechanism comprising a housing, a driving shaft, a driven shaft; a differentiating gearing including a differential case, a sun gear driven by the driving shaft, a sun gear connected to the driven shaft, and planet pinion means journalled on the case for rotation about the axes of the sun gears; retarding means having parts connected to the driving shaft and to the differential case and effective for bringing the differential case to the speed of the driving shaft; fluid displacement means including a part fixedly connected to the housing and a part fixedly connected to the differential case, said fixedly connected parts being effective upon relative movement to displace fluid, and means for controlling the back pressure of fluid at said parts.

2. A reverse and control gear mechanism comprising a housing, a driving shaft, a driven shaft; a differentiating gearing including a differential case, a sun gear driven by the driving shaft, a sun gear connected to the driven shaft, and planet pinion means journalled on the case for rotation about the axes of the sun gears; first and second fluid displacement means, said first fluid displacement means including a part connected to the driving shaft and a part connected to the differential case, said second fluid displacement means including a part fixedly connected to the housing and a part fixedly connected to the differential case, said parts in each said fluid displacement means being effective upon relative movement to displace fluid, separate means for controlling the back pressure of fluid in said fluid displacement means, and means for concurrently and oppositely actuating said controlling means.

3. A variable speed transmission comprising a sump for liquid, a driving shaft, a driven shaft; a differentiating gearing having sun gears connected to said shafts, and planet pinion means; retarding means connected to the driving shaft and to the planet pinion means for effecting a revolution of the planet pinion axes substantially at the speed of the driving shaft; a fluid displacement pump having one part connected to the housing and another part connected to said planet pinion means, a supply duct through which said pump sucks liquid from the sump, means for retarding the escape of liquid from the pump, a valve for selectively obstructing said duct, and an air valve for admitting air to said duct between said valve and pump to break the suction.

4. A reverse and control gear mechanism comprising a main housing, a driving shaft, a driven shaft, said shafts being coaxial, a revoluble structure concentric with said shafts, bearings for supporting said structure and shafts in the main housing, sun gears connected to said shafts and located inside said structure, planet pinion means journalled in said structure in mesh with the sun gears, releasable means for causing the revoluble structure to turn substantially at the speed of the driving shaft; fluid displacement means including a pump gear fixedly connected to said revoluble structure, a pump housing forming part of said main housing, and a pump pinion journalled in said housing; and means for controlling the back pressure at said pump gear and pump pinion.

5. A marine-type reverse and control gear mechanism for a high speed prime mover, comprising a housing forming a sump for liquid and having a removable end wall, a driving shaft, a driven shaft, differentiating gearing connecting said shafts and having a differential case revoluble relative thereto, a first liquid displacement means connected between said differential case and said driving shaft and means for controlling the escape of fluid therefrom for causing the said case to turn substantially at the speed of the driving shaft, a second liquid displacement means connected between said differential case and said end wall of the housing and means for controlling the escape of fluid for causing the said case to be detained against movement relative to the said housing, means for selectively and oppositely controlling the action of said liquid displacement means, said liquid displacement means having conduit connections to the sump to receive liquid therefrom, a small pinion located on said driven shaft outside said end wall, an anti-friction bearing for the driven shaft carried by said end wall of the housing closely adjacent said small pinion, a tail shaft and an internal gear connected to said tail shaft and in mesh with said small pinion, and end-thrust bearing means for supporting said tail shaft independently of said differentiating gearing.

6. A transmission mechanism including a driving and a driven member, a third member, differentiating gearing connecting said members, fluid displacement means connected to two of said members for producing retardation of relative movement thereof and including a suction conduit and a restricted delivery conduit, a liquid sump in communication with said suction conduit, an air inlet conduit connected to said suction conduit, first valve means on said air inlet conduit for opening or closing the same, and second valve means downstreamward of said first valve means and including a regulatable air admission valve for admitting a regulated amount of air into said conduits when said first valve means is closed.

7. A transmission mechanism including a driving and a driven member, a third member, differentiating gearing connecting said members, fluid displacement means connected to two of said members for producing retardation of relative movement thereof and including a suction conduit and a restricted delivery conduit, a liquid sump in communication with said suction conduit, an air inlet conduit connected to said suction conduit, and valve means on said air inlet conduit for restricting the same and including a regulatable device for procuring the admission of a regulated minimum amount of air into said conduits.

8. A transmission mechanism including a driving and a driven member, a third member, differentiating gearing connecting said members, fluid displacement means connected to two of said members for producing retardation of relative movement thereof and including a suction conduit and a restricted delivery conduit, a liquid sump in communication with said suction conduit, an air inlet conduit connected to said suction conduit, valve means for closing and opening said suction conduit, and further valve means for controlling the flow of air through said air inlet conduit.

9. A transmission mechanism including a frame, a driving and a driven member, a third member, differentiating gearing connecting said members, fluid displacement means having parts connected to said third member and to the frame for producing retardation of the movement of said third member relative to the frame and including a suction conduit and a restricted delivery conduit, a liquid sump in communication with said suction conduit, an air inlet conduit connected to said suction conduit, and valve means for restricting the flow of air through said air inlet conduit and constructed and arranged for movement into a position at which a greater quantity of air flows through said air inlet conduit.

10. A transmission mechanism including a frame, a driving and a driven member, a third member, differentiating gearing connecting said members, fluid displacement means having parts connected to said third member and to the frame for producing retardation of the movement of said third member relative to the frame and including a suction conduit and a restricted delivery conduit, a liquid sump in communication with said suction conduit, an air inlet conduit connected to said suction conduit, and valve means on said air inlet for restricting the same and including a regulatable device for procuring the admission of a regulated minimum amount of air into said conduits.

11. A transmission mechanism including a frame, a driving and a driven member, a third member, differentiating gearing connecting said members, fluid displacement means having parts connected to said third member and to the frame for producing retardation of the movement of said third member relative to the frame and including a suction conduit and a restricted delivery conduit, a liquid sump in communication with said suction conduit, an air inlet conduit connected to said suction conduit, valve means for closing and opening said suction conduit, and further valve means for controlling the flow of air through said air inlet conduit.

12. A reverse and control gearing mechanism comprising a frame, a driving and a driven member, a third member, differentiating gearing connecting said members, a first fluid displacement means connected to two of said members for producing retardation of relative movements thereof and including a first suction conduit and a first restricted delivery conduit, a second fluid displacement means connected to said third member and to said frame and including a second suction conduit and a second restriction delivery conduit, a liquid sump in communication with said suction conduits, first and second air inlet conduits respectively in communication with said first and second suction conduits, and valve means for controlling the admission of air into said suction conduits and connected so that movement for reducing the quantity of air introduced into one said suction conduit is accompanied by a movement for increasing the delivery of air into the other said suction conduit.

13. A reverse and control gearing mechanism comprising a frame, a driving and a driven member, a third member, differentiating gearing connecting said members, a first fluid displacement means connected to two of said members for producing retardation of relative movements thereof and including a first suction conduit and a first restricted delivery conduit, a second fluid displacement means connected to said third member and to said frame and including a second suction conduit and a second restriction delivery conduit, a liquid sump in communication with said suction conduits, first and second air inlet conduits respectively in communication with said first and second suction conduits, valve means for controlling the flow of liquid through the fluid displacement means whereby to vary the reaction therein, said valve means being connected for concurrent and inverse action so that one valve means is moved toward closed position when the other is moved toward open position, and further valve means for controlling the admission of air into said suction conduits and connected so that movement for reducing the quantity of air introduced into one said suction conduit is accompanied by a movement for increasing the delivery of air into the other said suction conduit.

14. A reverse and control gearing mechanism comprising a frame, a driving and a driven member, a third member, differentiating gearing connecting said members, a first fluid displacement means connected to two of said members for producing retardation of relative movements thereof and including a first suction conduit and a first restricted delivery conduit, a second fluid displacement means connected to said third member and to said frame and including a second suction conduit and a second restriction delivery conduit, a liquid sump in communication with said suction conduits, first and second air inlet conduits respectively in communication with said first and second suction conduits, valve means for controlling the flow of liquid through the fluid displacement means whereby to vary the reaction therein, said valve means being connected for concurrent and inverse action so that one valve means is moved toward closed position when the other is moved toward open position, and means for admitting predetermined minimum amounts of air into said suction conduits.

15. A reverse and control gearing mechanism comprising a frame, a driving and a driven member, a third member, differentiating gearing connecting said members, a first fluid displacement means connected to two of said members for producing retardation of relative movements thereof and including a first suction conduit and a first restricted delivery conduit, a second fluid displacement means connected to said third member and to said frame and including a second suction conduit and a second restriction delivery conduit, a liquid sump in communication with said suction conduits, first and second air inlet conduits respectively in communication with said first and second suction conduits, valve means for controlling the flow of liquid through the fluid displacement means whereby to vary the reaction therein, said valve means being connected for concurrent and inverse action so that one valve means is moved toward closed position when the other is moved toward open position, and further valve means for controlling the admission of air into said suction conduits and connected so that movement for reducing the quantity of air introduced into one said suction conduit is accompanied by a movement for increasing the delivery of air into the other said suction conduit, said further valve means including regulatable devices for procuring predetermined minima of air flow into said suction conduits.

OTTO E. SZEKELY.